United States Patent
Franklin et al.

(10) Patent No.: US 9,116,267 B2
(45) Date of Patent: Aug. 25, 2015

(54) BACKLIGHT STRUCTURES AND ASSEMBLIES FOR ELECTRONIC DEVICE DISPLAYS

(71) Applicant: Apple Inc., Cupertino, CA (US)

(72) Inventors: Jeremy C. Franklin, San Francisco, CA (US); Kevin D. Gibbs, San Carlos, CA (US); Amy Qian, San Jose, CA (US); John Raff, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 13/771,473

(22) Filed: Feb. 20, 2013

(65) Prior Publication Data

US 2014/0092630 A1    Apr. 3, 2014

Related U.S. Application Data

(60) Provisional application No. 61/707,724, filed on Sep. 28, 2012.

(51) Int. Cl.
*F21V 8/00* (2006.01)

(52) U.S. Cl.
CPC .............. *G02B 6/0031* (2013.01); *G02B 6/009* (2013.01)

(58) Field of Classification Search
CPC ..... G02B 6/0031; G02B 6/009; G02B 6/0021
USPC ................. 362/97.1, 97.3, 612, 609
See application file for complete search history.

(56) References Cited

U.S. PATENT DOCUMENTS

| | | | |
|---|---|---|---|
| 7,710,519 B2 | 5/2010 | Okuda | |
| 7,932,890 B2 * | 4/2011 | Onikiri et al. | 345/102 |
| 8,033,708 B2 * | 10/2011 | Tsubaki | 362/612 |
| 8,310,620 B2 | 11/2012 | Yabe | |
| 8,651,721 B2 * | 2/2014 | Kunimochi | 362/606 |
| 8,823,903 B2 * | 9/2014 | Momose et al. | 349/66 |
| 8,834,005 B2 * | 9/2014 | Kim et al. | 362/633 |
| 8,858,007 B2 * | 10/2014 | Kim et al. | 362/97.1 |
| 8,888,356 B2 * | 11/2014 | Son et al. | 362/616 |
| 8,920,015 B2 * | 12/2014 | Destain | 362/610 |
| 2010/0110328 A1 | 5/2010 | Tatebayashi et al. | |
| 2011/0058118 A1 * | 3/2011 | Kim | 349/61 |
| 2011/0222000 A1 | 9/2011 | Yabe et al. | |
| 2013/0027635 A1 | 1/2013 | Urano et al. | |
| 2013/0044271 A1 | 2/2013 | Momose et al. | |
| 2013/0229827 A1 * | 9/2013 | Takase | 362/609 |
| 2014/0092342 A1 * | 4/2014 | Franklin et al. | 349/62 |
| 2014/0092583 A1 * | 4/2014 | Franklin et al. | 362/97.1 |
| 2014/0133174 A1 * | 5/2014 | Franklin et al. | 362/606 |
| 2014/0133179 A1 * | 5/2014 | Franklin et al. | 362/612 |

* cited by examiner

*Primary Examiner* — Anabel Ton
(74) *Attorney, Agent, or Firm* — Treyz Law Group; Kendall P. Woodruff

(57) ABSTRACT

Electronic devices may include displays. A display may include backlight components such as a light guide plate that distributes light from a light source across the display. The light source may include a plurality of light-emitting diodes mounted on a printed circuit substrate. A portion of the light guide plate may be attached to the printed circuit substrate using adhesive. The adhesive may be a supported adhesive that includes a lining of reflective material. A reflective coating such as a layer of white coverlay may be formed on the surface of the printed circuit substrate and may be configured to reflect light into the light guide plate. The reflective coating may serve as a solder mask. The printed circuit substrate may be attached to a metal display chassis using adhesive. A shim may be used to raise the height of the light source relative to the printed circuit substrate.

18 Claims, 12 Drawing Sheets

BACKLIGHT STRUCTURES AND ASSEMBLIES FOR ELECTRONIC DEVICE DISPLAYS

This application claims the benefit of provisional patent application No. 61/707,724, filed Sep. 28, 2012, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size, weight, electrical grounding, robustness, ease of assembly, and light-tightness are often important considerations in designing electronic devices. If care is not taken, displays may be bulky, may exhibit undesired light reflections, or may be prone to damage during a drop event. The housing of an electronic device can be adjusted to accommodate a bulky display with large borders, but this can lead to undesirable enlargement of the size and weight of the housing and unappealing device aesthetics.

It would therefore be desirable to be able to provide improved ways to provide displays for electronic devices.

SUMMARY

An electronic device may be provided with a display. The display may have display layers for displaying images. Backlight structures may be included in the display. The backlight structures may provide backlight that illuminates the display layers in the display that are displaying an image for a user.

Display chassis structures may be used to support display layers and backlight structures. The display chassis structures may include a metal display chassis and a plastic display chassis.

A light source may launch light into an edge of a light guide plate in a display. The light source may include light-emitting diodes mounted on a printed circuit substrate. A portion of the light guide plate may be attached to the printed circuit substrate using adhesive. The adhesive may be a supported adhesive that includes a layer of reflective material interposed between first and second layers of optically clear adhesive.

The display may include a reflector that overlaps the light guide plate and is configured to reflect light into the light guide plate. The reflector may be adhered to the printed circuit substrate on which the light-emitting diodes are mounted.

A reflective coating may be formed on a surface of the flexible printed circuit and may be configured to reflect light into the light guide plate. The reflective coating may include a polymer based binder with a reflective additive such as a reflective pigment or dye. The reflective coating may be a layer of white coverlay that serves as a solder mask for the printed circuit on which light-emitting diodes are mounted.

A shim structure may be used to raise the height of light-emitting diodes with respect to the printed circuit substrate. The shim structure may be perforated to accommodate a solder connection between power supply terminals of the light-emitting diodes and solder pads on the printed circuit substrate.

The light-emitting diodes and the printed circuit substrate may be mounted within a bent portion of the metal display chassis. A friction-reducing material may be formed on the surface of the printed circuit substrate and may allow the printed circuit substrate to slide along the metal display chassis as the printed circuit substrate is received by the bent portion of the metal display chassis. The friction-reducing material may include a fluorocarbon based material or a low-friction shim structure.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
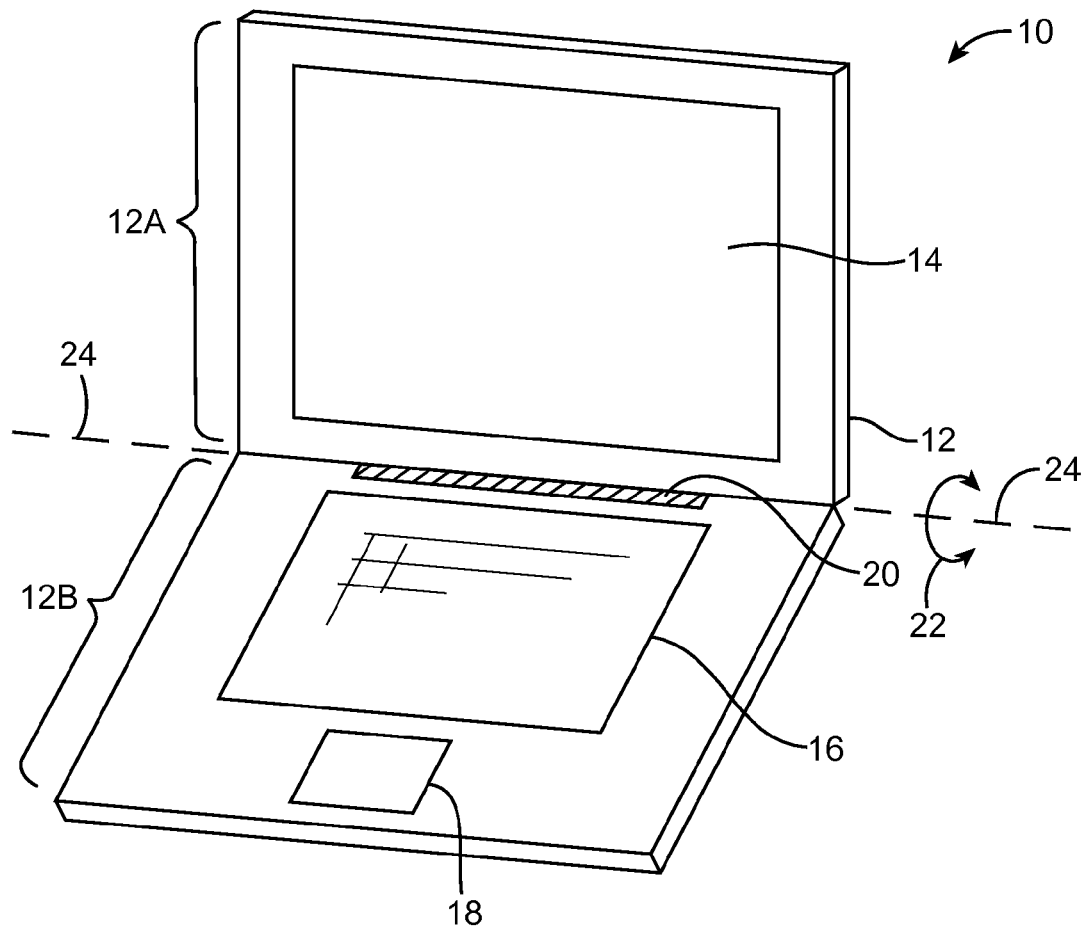
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
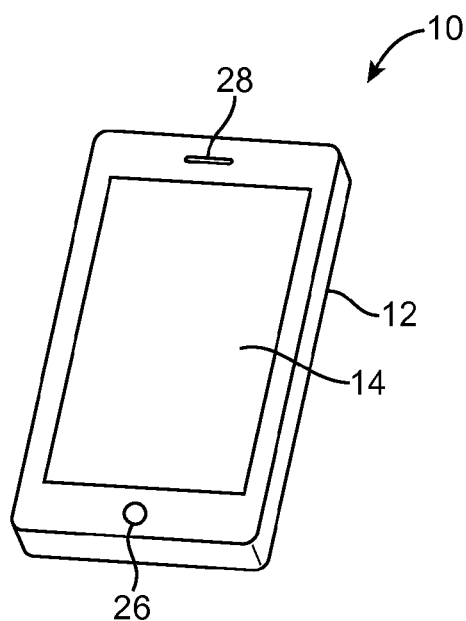
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
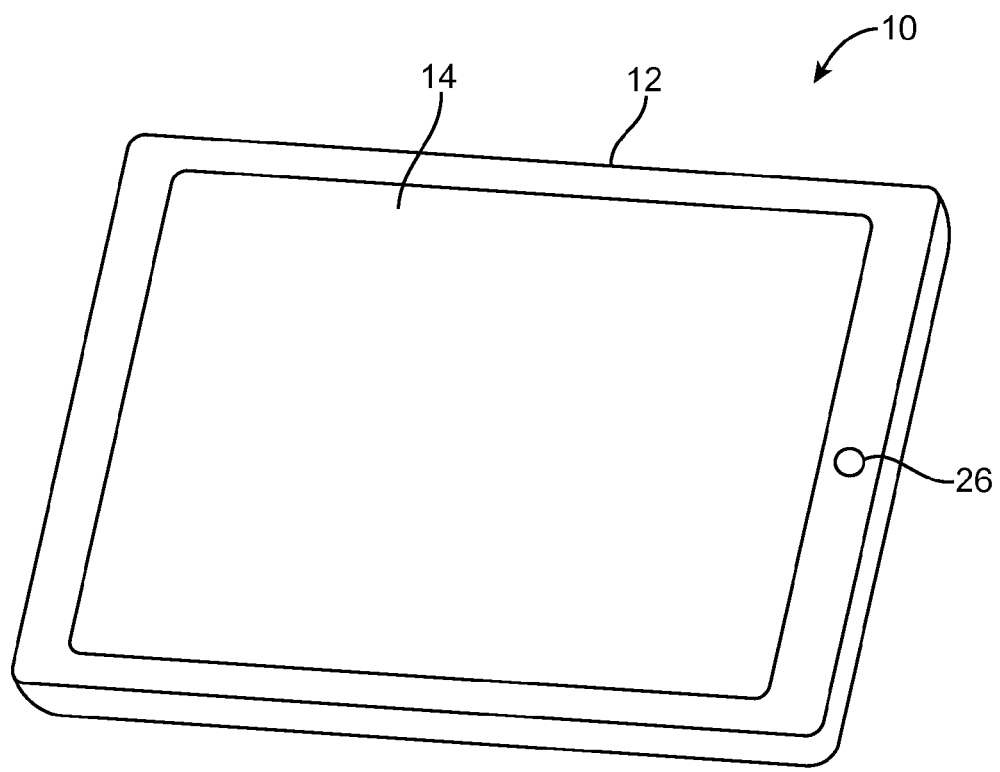
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined or cast aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
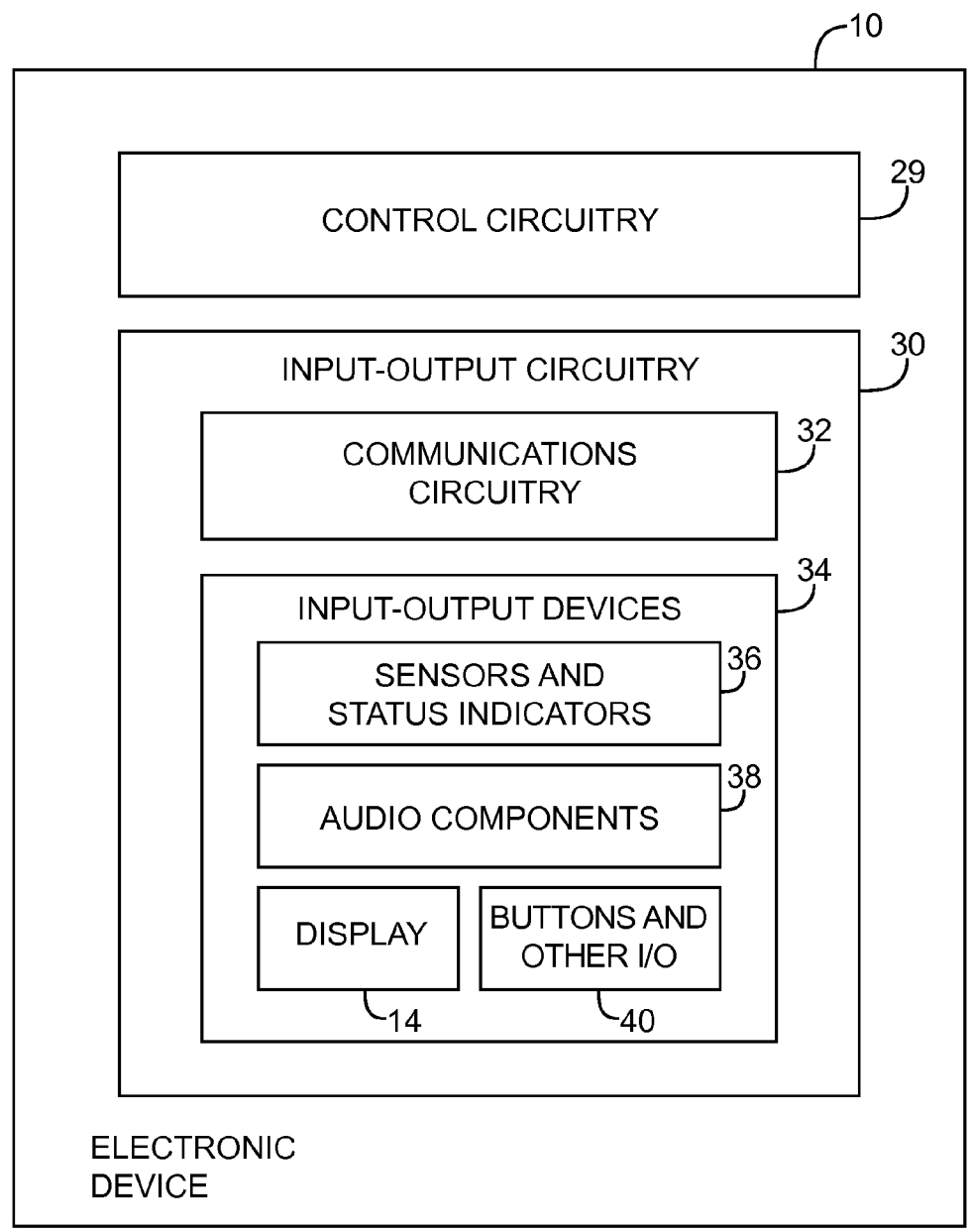
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
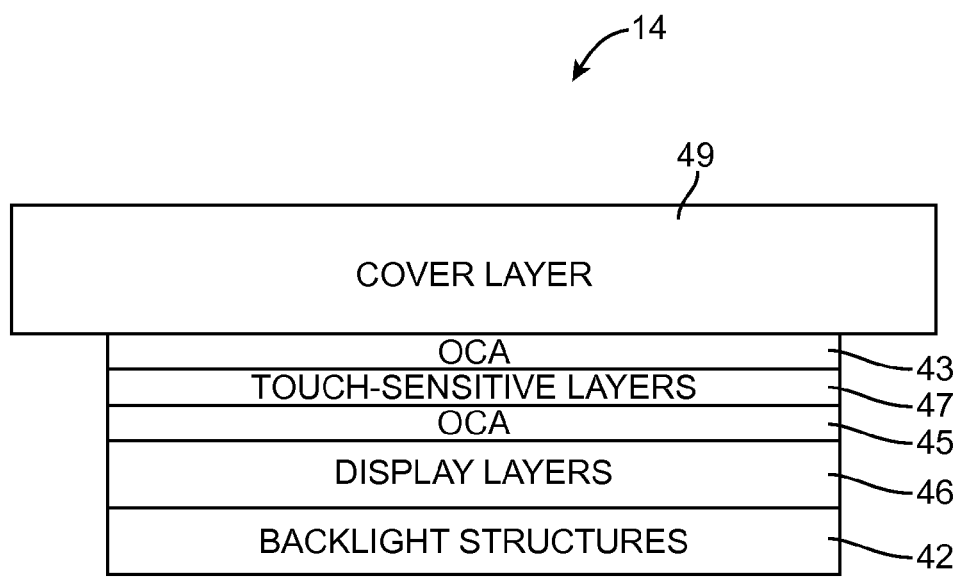
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include one or more layers of touch sensitive components such as touch-sensitive layers 47 that are attached to a cover layer such as cover layer 49. Cover layer 49 may be formed from a sheet of rigid or flexible transparent material such as glass or plastic.

Touch-sensitive layers 47 may be attached to cover layer 49 using an adhesive material such as optically clear adhesive (OCA) 43. Adhesive 43 may be a liquid adhesive, light-cured adhesive, pressure-sensitive adhesive or other suitable adhesive. Touch-sensitive layers 47 may include touch sensor components such as an array of capacitive touch sensor electrodes formed from transparent materials such as indium tin oxide.

Display 14 may include display layers such as layers 46 for generating images to be displayed on display 14. Display layers 46 may include polarizer layers, color filter layers, transistor layers, adhesive layers, layers of liquid crystal material, or other layers for generating display images. Display layers 46 may be attached to touch-sensitive layers 43 using adhesive such as optically clear adhesive 45. Adhesive 45 may be a liquid adhesive, light-cured adhesive, pressure-sensitive adhesive or other suitable adhesive.

Display layers 46 may use light generated by light-generating structures such as backlight structures 42 to form images to be viewed by a user of device 10. Backlight structures 42 may include light-generating components such as light-emitting diodes, light guiding structures, reflective structures, optical films, etc. Backlight structures 42 may be attached to display layers 46 or may be mounted adjacent to layers 46 by attaching backlight structures 42 to one or more structural members.

Figure 6:
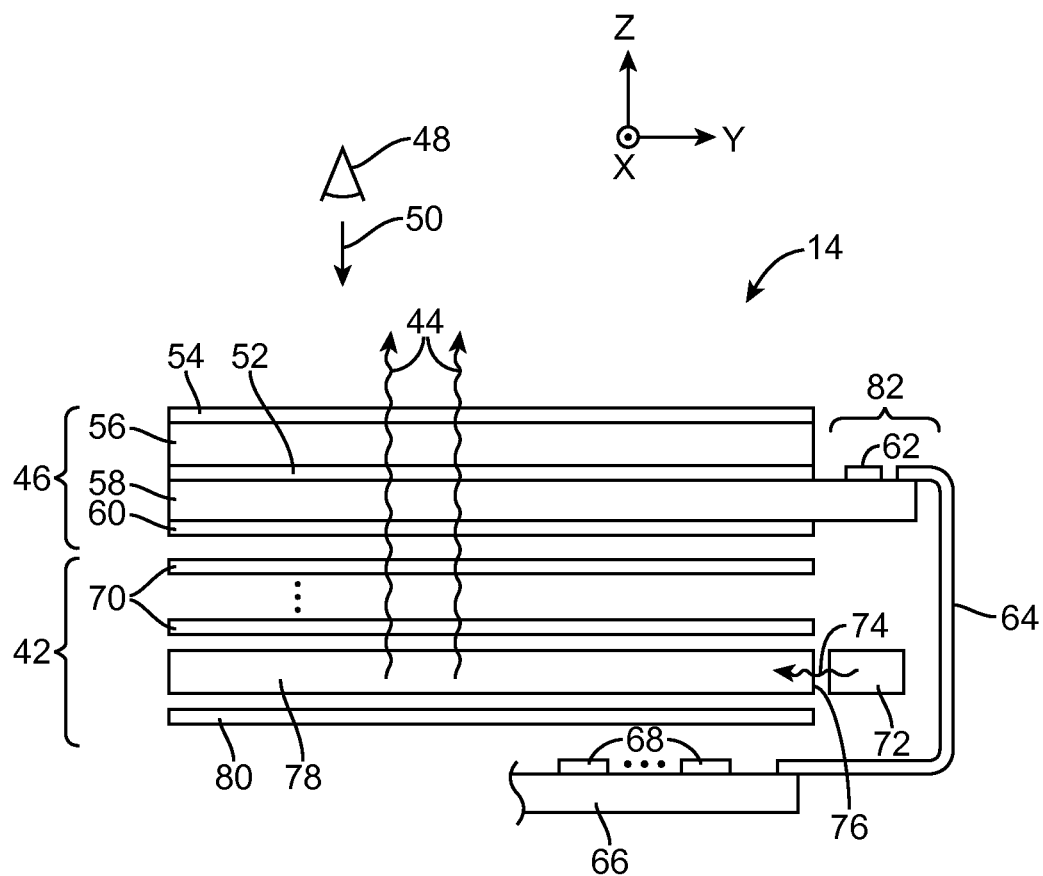
FIG. 6 is a cross-sectional side view of illustrative display layers and backlight structures in accordance with an embodiment of the present invention.

A cross-sectional side view of an illustrative configuration that may be used for display layers 46 and backlight structures 42 of display 14 (e.g., for display layers 46 and backlight structures 42 of the display of FIG. 5, or other suitable display) is shown in FIG. 6. As shown in FIG. 6, display 14 may include backlight structures 42 such as backlight unit 42 for producing backlight 44. During operation, backlight 44 travels outwards (vertically upwards in dimension Z in the orientation of FIG. 6) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54. If desired, upper polarizer layer 54 may be attached to an outer cover layer such as cover layer 49 (FIG. 5).

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 6) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64.

Printed circuit 66 may be formed from a rigid printed circuit board (e.g., a layer of fiberglass-filled epoxy) or a flexible printed circuit (e.g., a flexible sheet of polyimide or other flexible polymer layer). However, these examples are merely illustrative. If desired printed circuits 64 and 66 may be formed from a combination of rigid and flexible printed circuit layers (e.g., printed circuit 66 may be formed from a rigid printed circuit board with a layer of flexible printed circuitry that extends from an edge of printed circuit 66 to form flexible printed circuitry 64 that attaches to thin-film-transistor layer 58).

Backlight structures 42 may include a backlight light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed laterally in dimensions X and Y throughout light guide plate 78 due to the principal of total internal reflection. Light guide plate 78 may include light-scattering features such as pits or bumps or other light-scattering structures. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic, a layer of reflective film (e.g., a reflective film such as Vikuiti™ Enhanced Specular Reflector Film (ESR) or other suitable reflective film), or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 6, optical films 70 and reflector 80 may have a matching rectangular footprint.

Figure 7:
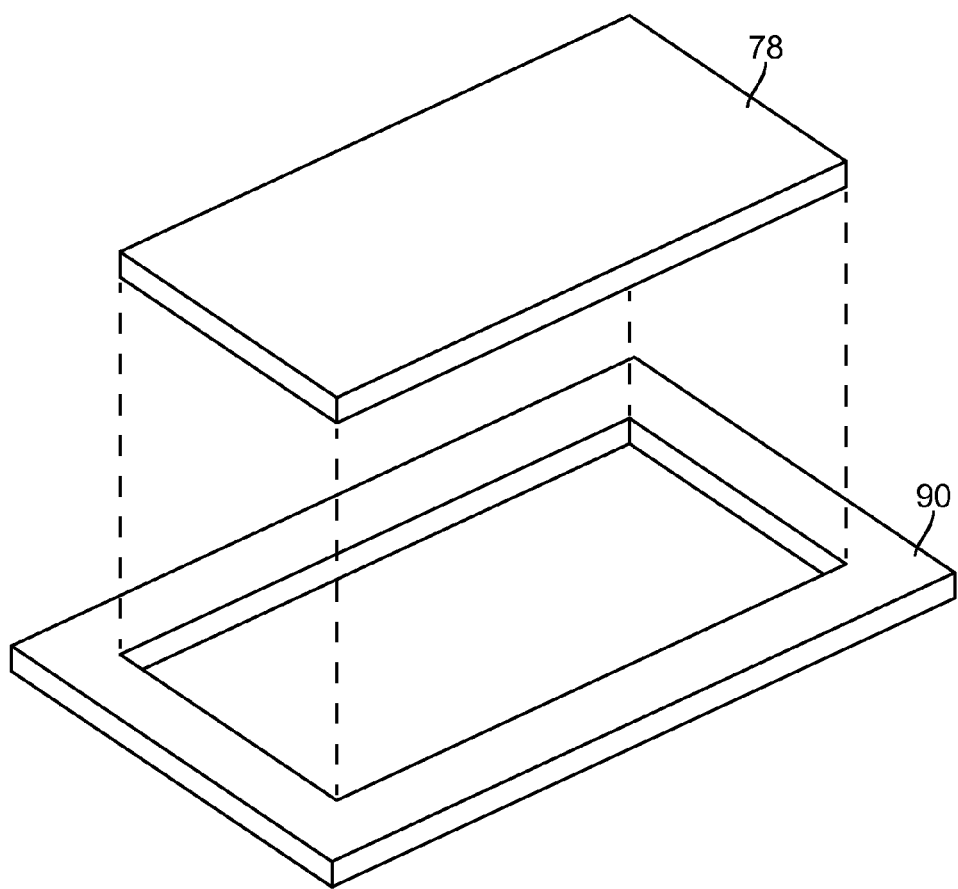
FIG. 7 is an exploded perspective view of a light guide plate and corresponding chassis structure in accordance with an embodiment of the present invention.

Display structures such as light guide plate 78 may be received within a support structure such as display chassis 90 of FIG. 7. Display chassis 90 may include plastic chassis structures and metal chassis structures. Display chassis 90 may serve as an interface between the structures of display 14 and surrounding portions of housing 12. If desired, display chassis 90 may include a ring of plastic (e.g., a plastic ring with a thickness of about 0.2 to 1.5 mm, as an example) or may be formed from a plate of material that includes a rectangular recess to accommodate display structures such as light guide plate 78. Chassis structure 90 may be formed from housing structures (e.g., as part of a housing frame, part of a unibody housing such as a metal housing, etc.).

The arrangement of FIG. 7 in which chassis structure 90 surrounds light guide plate 78 and is formed from a single contiguous structure is merely illustrative. If desired, chassis structure 90 may only partially surround light guide plate 78, may be formed from multiple structures, and/or may be formed from different materials.

Figure 8:
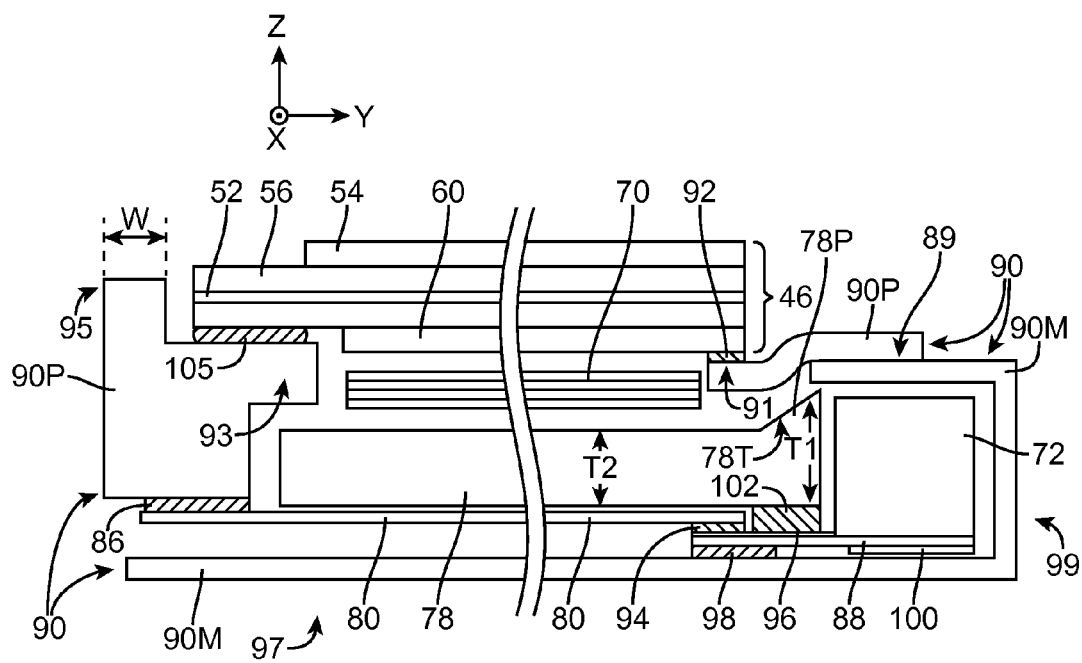
FIG. 8 is a cross-sectional side view of illustrative display layers, backlight structures, and chassis structures in accordance with an embodiment of the present invention.

An illustrative arrangement in which display 14 is mounted in a chassis structure that includes multiple parts formed from different materials is shown in FIG. 8. As shown in FIG. 8, chassis structure 90 may include a plastic display chassis such as plastic chassis member 90P (sometimes referred to as a p-chassis) and a metal display chassis such as metal chassis member 90M (sometimes referred to as an m-chassis). Plastic chassis member 90P and metal chassis member 90M may each be formed from a single structure or may each include multiple parts.

Display structures such as display layers 46 may have a first end mounted on a planar portion such as portion 91 of plastic chassis 90P. An adhesive such as adhesive 92 may be used in attaching an interior layer of display layers 46 such as lower polarizer 60 to planar surface 91 of plastic chassis 90P.

An opposing end of display layers 46 may be mounted on protruding portion 93 of chassis 90P using adhesive 105. Adhesives 92 and 105 may be liquid adhesives, light-cured adhesives, pressure-sensitive adhesives, or other suitable adhesives. If desired, adhesives 92 and 105 may be optically clear adhesives.

Plastic chassis 90P may be formed from materials such as polycarbonate, polycarbonate acrylonitrile butadiene styrene (PC-ABS), nylon, glass-filled polycarbonate, glass-filled nylon, silicone, or other suitable materials. Using a glass-reinforced plastic may lower the thermal expansion coefficient of chassis 90P. Chassis 90P may include any suitable amount of glass fibers (e.g., 10%, 20%, 30%, 40%, or other suitable amount of glass). If desired, chassis 90 may contain a sufficient amount of glass to lower the thermal expansion coefficient to a desired level without causing chassis 90P to be excessively rigid. If desired, chassis 90P may be free of glass fibers. The example in which chassis 90P is formed from glass-filled polycarbonate (e.g., a low-glass-filled polycarbonate) is merely illustrative.

Features such as low coefficient of thermal expansion and low rigidity may ensure that chassis 90P provides structural support for display 14 without inducing undesired stress on display 14. For example, the thermal expansion coefficient of chassis 90P may be matched to that of other structures in device 10 such as device housing structures (e.g., housing 12 of FIGS. 1, 2, and 3). This may ensure that chassis 90P and the surrounding structures such as housing 12 expand at similar rates when device 10 heats up.

Chassis 90P may be provided with other features that may help minimize mechanical stress on display 14. For example, chassis 90P may have a minimized footprint in the X-Y plane. Wall sections such as wall section 95 of chassis 90P may, for example, have a width W of about 0.1 mm, 0.2 mm, 0.3 mm, less than 0.3 mm, more than 0.3 mm, etc.

Chassis structure 90P may be molded (e.g., using an injection molding process or other suitable molding process), machined, thermoformed, or may be formed using any other suitable fabrication process. Plastic chassis 90P may, for example, be injection molded over metal chassis 90M (e.g., at the corners of device 10 or at other suitable locations in device 10). In the example of FIG. 8, plastic chassis 90P is attached to metal chassis 90M at location 89.

Metal chassis 90M may be formed from stainless steel sheet metal or other suitable materials. Chassis 90M may have a planar portion such as portion 97 that overlaps light guide plate 78 and a bent portion such as portion 99 that wraps around an edge portion of light guide plate 78 (e.g., using a C-shaped wrap). As shown in FIG. 8, backlight structures may be mounted in c-shaped portion 99 of chassis 90M. For example, light-emitting diodes 72 may be mounted on a substrate such as substrate 88. Light-emitting diodes 72 and substrate 88 may be mounted within c-shaped portion 99 of chassis 90M (e.g., light-emitting diodes 72 and substrate 88 may be interposed between upper and lower layers of metal chassis 90M). Substrate 88 may be formed from a rigid printed circuit board material (e.g., fiberglass-filled epoxy material such as FR4) or a flexible printed circuit substrate material such as polyimide or a sheet of other flexible polymer. Substrate 88 may be mounted on planar portion 97 of chassis 90M.

Light guide plate 78 may have a locally thickened portion such as locally thickened portion 78P. Locally thickened portion 78P of light guide plate 78 may be formed along an edge of light guide plate 78 that is adjacent to light-emitting diodes 72. Locally thickened portion 78P may have a thickness T1 that is greater than thickness T2 of light guide plate 78. Light guide plate 78 may have a tapered surface such as tapered surface 78T that bridges the thinner portions of light guide plate 78 with locally thickened portion 78P of light guide plate 78. Tapered surface 78T may be formed by stamping, molding, embossing, adding thermoplastic material to portion 78P using heat, laminating additional film material, adding clear adhesive to light guide plate portion 78P, or by otherwise enhancing the thickness of the light guide plate 78 in portion 78P.

As shown in FIG. 8, reflector 80 may be interposed between metal chassis 90M and light guide plate 78. If desired, reflector 80 may be attached to plastic chassis 90P using an adhesive such as adhesive 86 (e.g., a pressure sensitive or other suitable adhesive). This is, however, merely illustrative. If desired, reflector 80 may be floating with respect to plastic chassis 90P and adhesive 86 may be omitted.

In conventional backlight arrangements, a light guide plate is often floating with respect to the light-emitting diodes that launch light into the light guide plate. To constrain the light guide plate, the light guide plate is sometimes attached to a plastic display chassis using adhesive. This type of attachment is typically made on a side of the light guide plate that opposes the light-emitting diodes.

This type of conventional backlight arrangement in which a light guide plate floats with respect to an array of light-emitting diodes can have an adverse impact on the optical efficiency of a display backlight. For example, during thermal expansion and contraction events, large air gaps may occur between light-emitting diodes and a light guide plate. The presence of large air gaps between light-emitting diodes and a light guide plate can result in poor backlight efficiency, which may in turn decrease power consumption efficiency and can reduce battery life in an electronic device.

A backlight arrangement of the type shown in FIG. 8 may be used to ensure that gaps between light-emitting diodes 72 and light guide plate 78 are minimized. As shown in FIG. 8, light guide plate 78 may be attached to substrate 88 on which light-emitting diodes 72 are mounted. An adhesive such as adhesive 102 may be used in attaching portion 78P of light guide plate 78 to substrate 88. Reflector 80 may also be attached to substrate 88 using an adhesive such as adhesive 94. Substrate 88 may in turn be attached to planar surface 97 of metal chassis 90M using an adhesive such as adhesive 98. Adhesives 102, 94, and 98 may be liquid adhesives, light-cured adhesives, pressure-sensitive adhesives, other suitable adhesives, combinations of these adhesives, etc. If desired, adhesives 102, 94, and 98 may be optically clear adhesives.

A friction-reducing material such as friction-reducing material 100 may attached to a lower surface of substrate 88 (e.g., friction-reducing material 100 may be interposed between substrate 88 and planar surface 97 of chassis 90M). Friction-reducing material 100 may be used in mounting backlight structures within c-shaped portion 99 of chassis 90M.

Adhesive 102 may be interposed between light-emitting diodes 72 and reflector 80. Portions of light guide plate 78 which do not overlap reflector 80 may overlap a layer of reflective material such as reflective layer 96. Reflective material 96 may help reflect light into light guide plate 78 at portions of light guide plate 78 that do not overlap reflector 80. The presence of reflective material 96 may ensure that the transition from reflector 80 to light-emitting diodes 72 does not adversely affect backlight efficiency.

Figure 9:
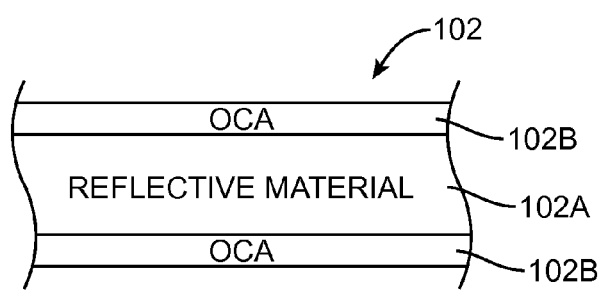
FIG. 9 is a cross-sectional side view of an illustrative adhesive that includes a lining of reflective material in accordance with an embodiment of the present invention.

If desired, adhesive 102 may also be configured to reflect light into light guide plate 78. For example, adhesive 102 may have a configuration of the type shown in FIG. 9. As shown in FIG. 9, adhesive 102 may be a supported adhesive that includes a lining of reflective material such as reflective layer 102A interposed between layers of optically clear adhesive (OCA) such as optically clear adhesive layers 102B. Reflective layer 102A may be formed from a reflective polymer (e.g., a white polymer such as white polyethylene terephthalate or other suitable reflective polymer resin), may be formed from a reflective film (e.g., a reflective film such as Vikuiti™ Enhanced Specular Reflector Film (ESR) or other suitable reflective film), or may be formed from other suitable reflective materials. Lining adhesive 102 with a reflective material may ensure that the transition from reflector 80 to light-emitting diodes 72 does not have an adverse effect on backlight efficiency.

Reflective material 96 on the surface of substrate (FIG. 8) may be formed from a reflective coverlay material (a white polyimide or polyester coverlay material), a layer of printed white ink, a layer of reflective film (e.g., a reflective film such as Vikuiti™ Enhanced Specular Reflector Film (ESR) or other suitable reflective film), a layer of white tape, or other suitable reflective materials. Reflective material 96 may formed on the surface of substrate 88 (e.g., interposed between adhesive 96 and substrate 88) using any suitable application process (e.g., laminating, screen printing, other suitable application processes, etc.).

Figure 10:
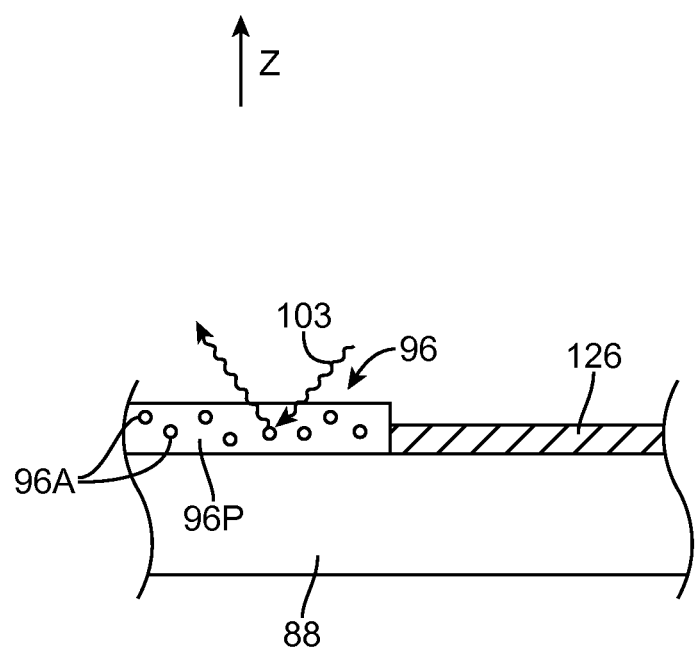
FIG. 10 is a cross-sectional side view of an illustrative printed circuit substrate that includes a coating of reflective material in accordance with an embodiment of the present invention.

As shown in FIG. 10, for example, reflective material 96 may be formed from a polymer-based binder such as polymer-based binder 96P that includes a reflective additive such as reflective additive 96A. Polymer-based binder 96P may be a layer of polyimide, polyester, or other suitable polymer. Reflective additive 96A may be a reflective dye or pigment (e.g., a titanium dioxide powder or other white or shiny material). As shown in FIG. 10, reflective additive 96A may be configured to reflect light 103 upwards in the Z direction (e.g., towards light guide plate 78 of FIG. 8). Reflective additive 96A may be configured to reflect more than 30% of incident light, more than 50% of incident light, more than 70% of incident light, more than 90% incident light, etc.

Reflective coating 96 may be a coverlay material that serves as a solder mask for printed circuit substrate 88. For example, reflective coating 96 may surround or partially surround solder pads such as solder pad 126 and may prevent solder from contaminating portions of substrate 88 (e.g., reflective coating 96 may prevent solder from bridging adjacent contact pads 126).

Figure 11:
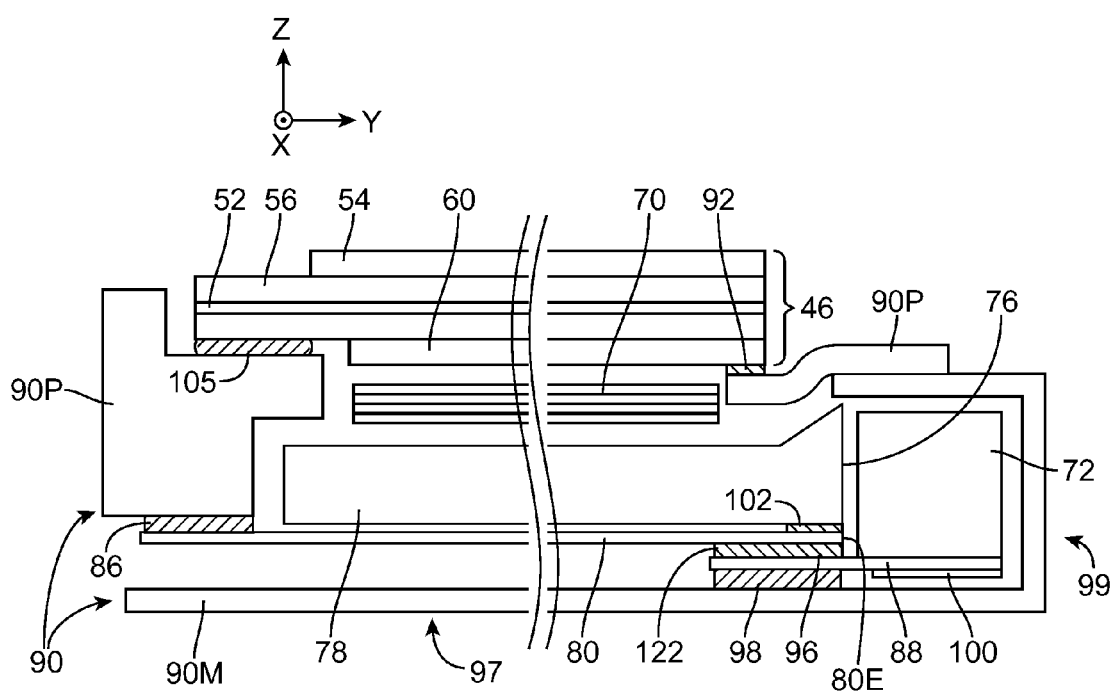
FIG. 11 is a cross-sectional side view of illustrative display layers, backlight structures, and chassis structures in accordance with an embodiment of the present invention.

Another illustrative backlight arrangement that may help minimize gaps between light guide plate 78 and light-emitting diodes 72 is shown in FIG. 10. In the example of FIG. 11, reflector 80 extends to the edge of light guide plate 78. Reflector 80 may be interposed between adhesive 120 and adhesive 122. Adhesive 120 may be used in attaching an upper surface of reflector 80 to light guide plate 78, whereas adhesive 122 may be used in attaching a lower surface of reflector 80 to substrate 88. Adhesives 120 and 122 may be liquid adhesives, light-cured adhesives, pressure-sensitive adhesives, other suitable adhesives, combinations of these adhesives, etc. If desired, adhesives 120 and 122 may be optically clear adhesives. In one suitable embodiment, reflector 80 may be a layer of reflective film (e.g., a reflective film such as Vikuiti™ Enhanced Specular Reflector Film (ESR) or other suitable reflective film) that forms a lining between adhesives 120 and 122, thereby forming a supported adhesive that attaches light guide plate 78 to substrate 88.

If desired, a reflective coating may be formed on the upper surface of substrate 88 (e.g., interposed between light guide plate 78 and substrate 88) and may be used to reflect light into light guide plate 78. For example, a layer of white coverlay material (e.g., similar to reflective material 96 of FIG. 8) may be formed on the surface of printed circuit substrate 88. This may ensure that the transition from reflector 80 to light-emitting diodes 72 does not have an adverse effect on backlight efficiency. This is, however, merely illustrative. If desired, substrate 88 may be free of reflective coatings. For example, edge 80E of reflector 80 may be flush with edge 76 of light guide plate 78, thereby providing a reflective surface that overlaps all or substantially all of light guide plate 78. With this type of arrangement, white coverlay on the surface of substrate 88 may not be necessary.

In the examples of FIGS. 8 and 11, printed circuit substrate 88 is attached to planar surface 97 of chassis 90M using an adhesive such as adhesive 98. Prior to adhering substrate 88 to chassis 90M, substrate 88 may be inserted into c-shaped portion 99 of chassis 90M. In order to ensure that adhesive 98 does not adhere to planar surface 97 of chassis 90M until substrate 88 is received within bent portion 99, substrate 88 may slide on friction-reducing material 100 at an angle with respect to planar surface 97 until substrate 88 is received by bent portion 99.

Figure 12:
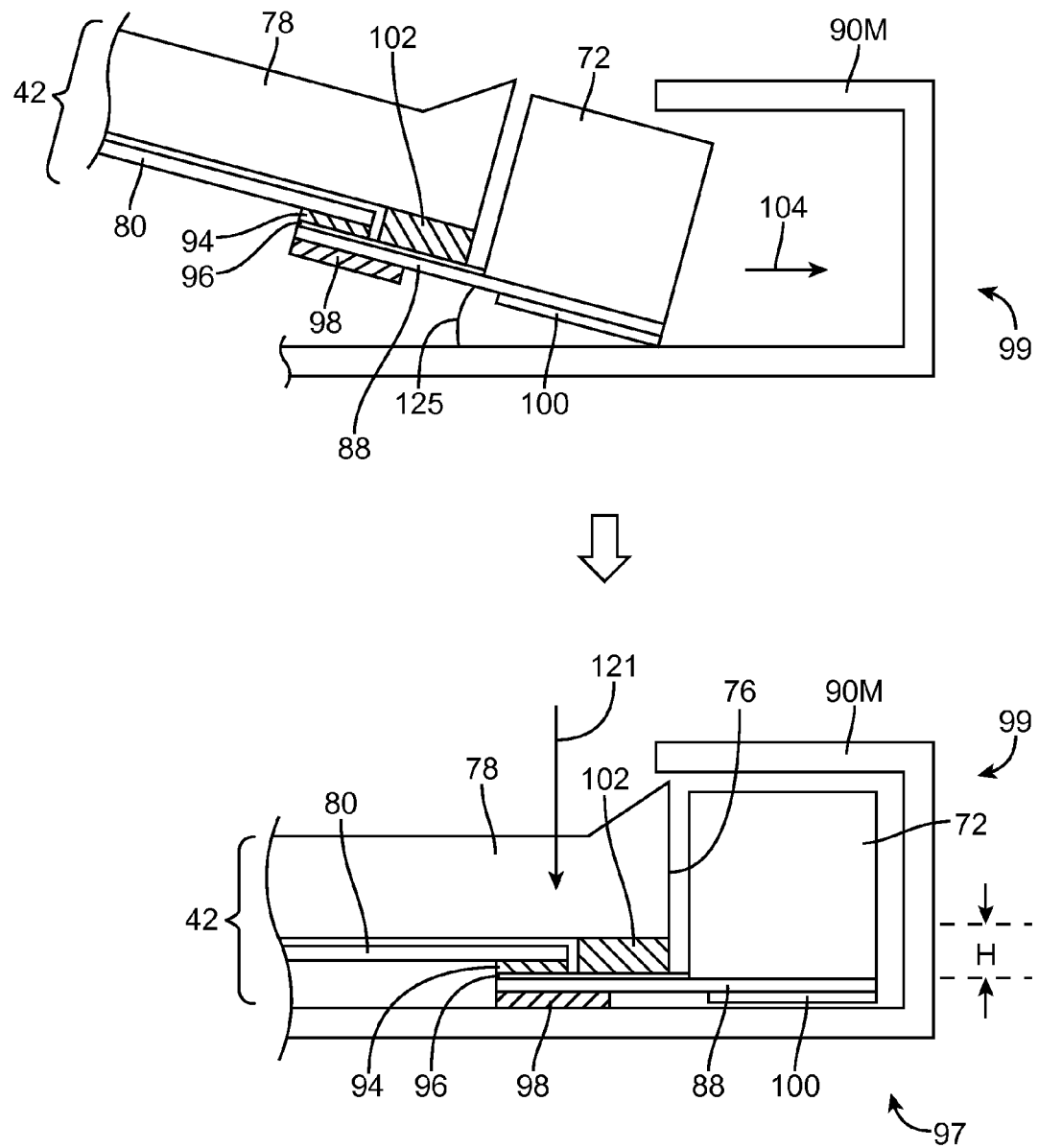
FIG. 12 is an illustrative diagram showing how a friction-reducing material may be formed on a printed circuit substrate and may be used to slide the printed circuit substrate and associated backlight components into a bent portion of a metal display chassis in accordance with an embodiment of the present invention.

A diagram illustrating how friction-reducing material 100 of FIGS. 8 and 11 may be used in mounting backlight structures (e.g., light-emitting diodes 72, substrate 88, and an edge portion of light guide plate 78) within bent portion 99 of chassis 90M is shown in FIG. 12.

As shown in the upper portion of FIG. 12, backlight structures 42 may be mounted within c-shaped portion 99 of chassis 90M by sliding substrate 88 on friction-reducing material 100 in direction 104. An angle such as angle 125 may be formed between substrate 88 and planar portion 97 of chassis 90M as substrate 88 slides into portion 99. Friction-reducing material 100 may provide a low-friction interface between substrate 88 and chassis 90M that allows substrate 88 to slide smoothly in direction 104. By keeping substrate 88 at an angle with planar portion 97 of chassis 90M, adhesive 98 may remain separated from chassis 90M until backlight structures are received within portion 99 of chassis 90M. Angle 125 between substrate 88 and planar surface 97 of chassis 90M may be any suitable angle between 0° and 90° (e.g., 15°, 30°, etc.).

As shown in the lower portion of FIG. 12, once backlight structures 42 have been received within c-shaped opening 99 of chassis 90M, substrate 88 may be pressed in direction 121 (e.g., to bring substrate 88 in parallel with planar portion 97 of chassis 90M), thereby bringing adhesive 98 into contact with planar portion 97 of chassis 90M and attaching substrate 88 to chassis 90M. In arrangements where adhesive 98 is a pressure sensitive adhesive, the downward pressure provided by pressing light guide plate 78 in direction 124 may activate adhesive 98 to form a bond with chassis 90M.

Friction-reducing material 100 may, for example, be formed from a corrugated surface on the underside of substrate 88 (e.g., to reduce the amount of surface area of substrate 88 in contact with chassis 90M as substrate 88 slides into portion 99), may be formed from low-friction pads attached to the underside of substrate 88, may be a low-friction shim structure attached to the underside of substrate 88 (e.g., a metal, glass, ceramic, or plastic shim structure), or may have other suitable forms. If desired, friction-reducing material 100 may be a coating of low-friction material, may be a low-friction film (e.g., a low-friction film deposited or applied to the underside of substrate 88), or may be a separate structure formed from low-friction material that is attached to substrate 88 (e.g., using adhesive or other attachment mechanisms).

Friction-reducing material 100 may be formed from a low-friction polymer such as a halogen based polymer or fluorocarbon based polymer (e.g., polytetrafluoroethylene), or may be formed from other suitable slick materials such as graphite, silicone based lubricants, etc.

As shown in FIG. 12, a gap of height H may be formed between light guide plate 78 and substrate 88 to accommodate reflector 80 and adhesive 102. Light-emitting diodes 72 may emit light at a height relative to substrate 88 that is equal to or greater than height H. This may allow light emitted by light-emitting diodes 72 to enter light guide plate 78 at edge 76.

Figure 13:
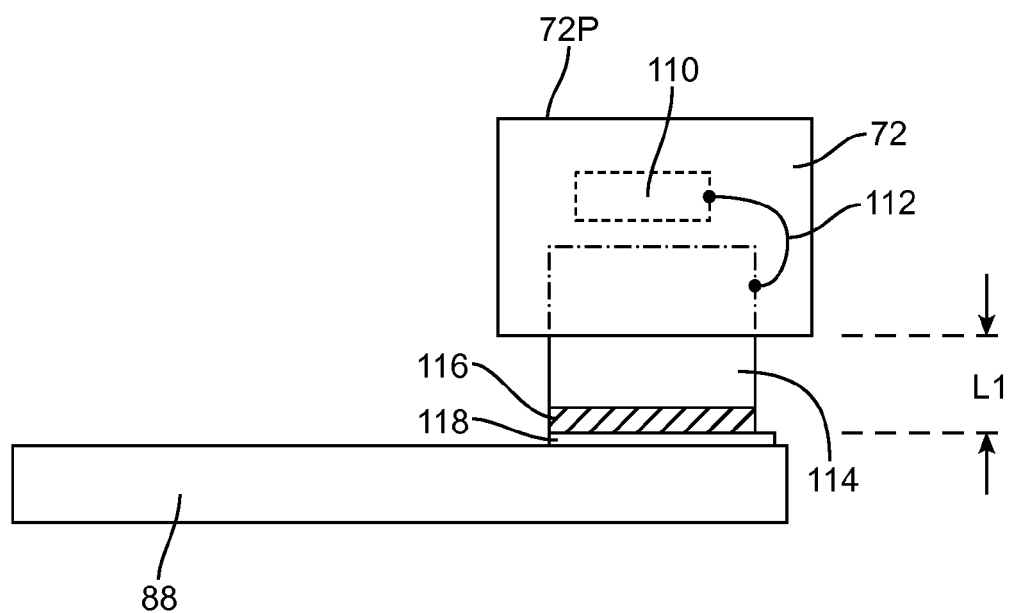
FIG. 13 is a cross-sectional side view of an illustrative light-emitting diode that is mounted on elongated frame structures in accordance with an embodiment of the present invention.

To ensure that light-emitting diodes 72 emit light at a height relative to substrate 88 that is equal to or greater than height H, light-emitting diodes 72 may have a configuration of the type shown in FIG. 13. As shown in FIG. 13, each light-emitting diode 72 may include a semiconductor device such as diode die 110 mounted within a molded package such as package 72P. Diode die 110 may be mounted on one or more lead frame structures such as lead frame structure 114. A wire bond such as wire bond 112 may be used to electrically couple one of the diode's terminals to lead frame structure 114. Lead frame structure 114 may extend out from package 72P towards substrate 88 on which light-emitting diodes 72 are mounted. Lead frame structure 114 may be mounted to solder pad 118 on substrate 88 using solder 116.

Lead frame structures 114 may be elongated to serve as stilts for light-emitting diodes 72. For example, lead frame structures 114 may increase the height at which light is emitted from diode 110 relative to substrate 88 by a length L1. Elongated lead frame structures 114 may ensure that light emitted from diode die 110 is launched directly into the edge of light guide plate 78 even when a gap of height H (FIG. 12) is present between light guide plate 78 and substrate 88.

Figure 14:
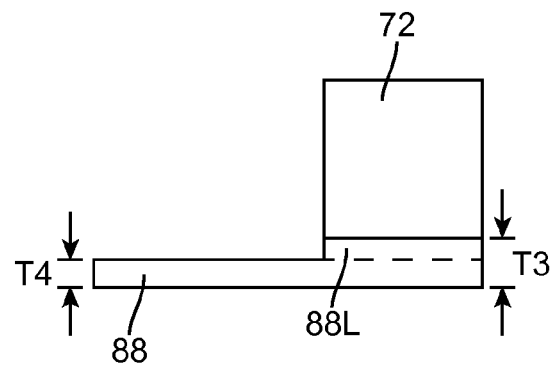
FIG. 14 is a cross-sectional side view of an illustrative light-emitting diode that is mounted on a thickened portion of a printed circuit substrate in accordance with an embodiment of the present invention.

Another suitable arrangement that may be used to accommodate a gap between light guide plate 78 and substrate 88 is shown in FIG. 14. As shown in FIG. 14, a thickening layer such as layer 88L may be added to portions of printed circuit substrate 88. Portions of substrate 88 that include layer 88L may have a thickness T3 that is greater than a thickness T4 of portions that do not include layer 88L. Light-emitting diodes 72 may be mounted on additional layer 88L. Mounting light-emitting diodes 72 on a thickened portion of substrate 88 may ensure that light emitted from diodes 72 is launched directly into the edge of light guide plate 78 even when a gap of height H (FIG. 12) is present between light guide plate 78 and substrate 88.

If desired, layer 88L may also be used as a thermal management layer. For example, conductive structures such as copper traces may be formed on layer 88L and may be configured to transfer heat away from light-emitting diodes 72.

Figure 15:
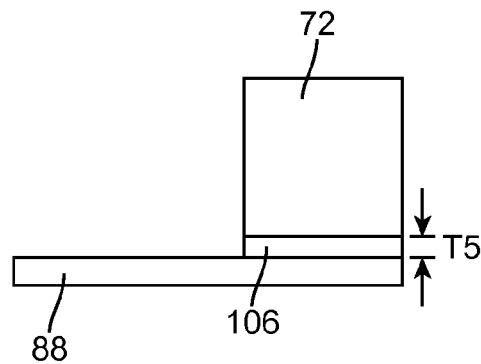
FIG. 15 is a cross-sectional side view of an illustrative light-emitting diode that is mounted on a shim in accordance with an embodiment of the present invention.

Another suitable arrangement that may be used to accommodate a gap between light guide plate 78 and substrate 88 is shown in FIG. 15. As shown in FIG. 15, a shim such as shim 106 may be interposed between light-emitting diodes 72 and substrate 88. Shim 106 may be formed from plastic (e.g., polyimide or other suitable polymer-based material) or may be formed from other suitable material. Shim 106 may have a thickness T5 and may therefore be used to raise the height of light-emitting diodes 72 relative to substrate 88 by length T5.

Shim 106 may be configured to accommodate an electrical connection between light-emitting diodes 72 and traces on substrate 88. For example, as shown in the exploded perspective view of FIG. 16, shim 106 may include openings such as openings 108 (sometimes referred to as perforations) which may be used in providing an electrical path from light-emitting diodes 72 and contact pads such as contact pads 126 on substrate 88.

Figure 16:
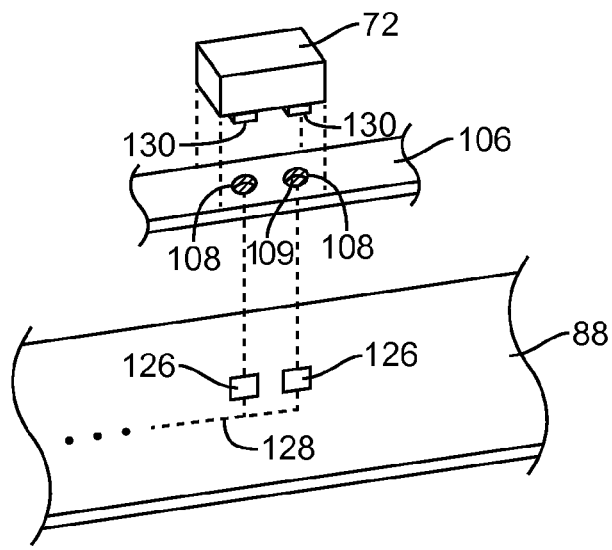
FIG. 16 is an exploded perspective view showing how a shim on which a light-emitting diode is mounted may be provided with openings to accommodate a solder connection between power supply terminals of the light-emitting diode and solder pads on a printed circuit substrate in accordance with an embodiment of the present invention.

As shown in FIG. 16, light-emitting diodes 72 may include terminals such as terminals 130. Terminals 130 (sometimes referred to as lead frame structures) may extend out from under diodes 72. This is, however, merely illustrative. If desired, terminals 130 may extend out the sides of diodes 72 or may extend out of the rear of diodes 72. Terminals 130 may include positive and negative power supply terminals. A power supply signal may be supplied across the positive and negative terminals for each diode 72 to adjust the power of the emitted light from that diode. Metal traces such as illustrative trace 128 of FIG. 16 may be formed on substrate 88 to provide power to terminals 130 of light-emitting diodes 72.

Solder may be used to soldering light-emitting diodes 72 to substrate 88 (e.g., to solder lead frame structures 130 to solder pads 126 and other traces 128 on substrate 88). Openings 108 in shim 106 may be used to accommodate a solder connection between terminals 130 and contact pads 126. For example, shim 106 may be placed on substrate 88 such that openings 108 align with contact pads 126. Solder 109 may be applied over openings 108 and may fill openings 108 to make contact with solder pads 126. Light-emitting diodes 72 may be mounted on shim 106 such that terminals 130 align with openings 108. Solder 109 within openings 108 may be used in forming an electrical and mechanical connection between terminals 130 and contact pads 126.

Mounting light-emitting diodes 72 on shim 106 may ensure that light emitted from diodes 72 is launched directly into the edge of light guide plate 78 even when a gap of height H (FIG. 12) is present between light guide plate 78 and substrate 88. This is, however, merely illustrative. If desired, light-emitting diodes 72 may be mounted within a plastic housing that is molded such that light emitted from diodes 72 is launched directly into the edge of light guide plate 78 even when a gap is present between light guide plate 78 and substrate 88 (e.g., such that the height increasing structures of FIGS. 13-16 are not required).

The foregoing is merely illustrative of the principles of this invention and various modifications can be made by those skilled in the art without departing from the scope and spirit of the invention.

What is claimed is:

1. An electronic device, comprising:
    display layers;
    a light source configured to provide light;
    a printed circuit substrate on which the light source is mounted;
    a light guide plate configured to receive the light and to provide the light to the display layers as backlight illumination, wherein the light guide plate is adhered to the printed circuit substrate using adhesive; and
    a reflector configured to reflect the light into the light guide plate, wherein the reflector is adhered to the printed circuit substrate using additional adhesive.

2. The electronic device defined in claim 1 further comprising a plastic display chassis configured to receive the display layers, wherein the light guide plate is floating with respect to the plastic display chassis.

3. The electronic device defined in claim 1 wherein the adhesive comprises a layer of reflective film interposed between first and second layers of optically clear adhesive.

4. The electronic device defined in claim 1 wherein the adhesive is a supported adhesive that includes a layer of white polymer resin interposed between first and second layers of optically clear adhesive.

5. The electronic device defined in claim 1 further comprising a metal display chassis that at least partially surrounds the light source, wherein the printed circuit substrate is adhered to metal display chassis.

6. The electronic device defined in claim 5 wherein the metal display chassis comprises a bent portion that receives the light source, the electronic device further comprising:
    a friction-reducing material formed on a surface of the printed circuit substrate, wherein the friction-reducing material is configured to slide along the metal display chassis as the light source is received by the bent portion of the metal display chassis.

7. The electronic device defined in claim 1 further comprising a layer of reflective coating formed on a surface of the printed circuit substrate, wherein the reflective coating is configured to reflect the light into the light guide plate.

8. A backlight assembly configured to provide backlight illumination for a display, comprising:
    a light guide plate having a surface from which the backlight illumination is provided to the display and having an edge into which light is launched to form the backlight illumination;
    a printed circuit substrate;
    a plurality of light-emitting diodes mounted on the printed circuit substrate; and
    a coating of reflective material on a surface of the printed circuit substrate, wherein the coating of reflective material is configured to reflect the light into the light guide plate and wherein the coating of reflective material comprises white coverlay material.

9. A backlight assembly configured to provide backlight illumination for a display, comprising:
    a light guide plate having a surface from which the backlight illumination is provided to the display and having an edge into which light is launched to form the backlight illumination;
    a printed circuit substrate;
    a plurality of light-emitting diodes mounted on the printed circuit substrate; and
    a coating of reflective material on a surface of the printed circuit substrate, wherein the coating of reflective material is configured to reflect the light into the light guide plate, wherein the coating of reflective material comprises a polymer based binder and a reflective additive, and wherein the reflective additive is configured to reflect the light into the light guide plate.

10. The backlight assembly defined in claim 9 wherein the printed circuit substrate comprises a flexible printed circuit substrate.

11. The backlight assembly defined in claim 9 further comprising a metal display chassis that at least partially surrounds the light source, wherein the printed circuit substrate is attached to the metal display chassis using adhesive.

12. The backlight assembly defined in claim 9 further comprising a reflector configured to reflect the light into the light guide plate, wherein the light guide plate overlaps the reflector, wherein the reflector has a portion that is interposed between the light guide plate and the printed circuit substrate, and wherein the reflector is attached to the printed circuit substrate using adhesive.

13. A backlight assembly configured to provide backlight illumination for a display, comprising:
    a light guide plate having a surface from which the backlight illumination is provided to the display and having an edge into which light is launched to form the backlight illumination;
    a printed circuit substrate;
    a plurality of light-emitting diodes mounted on the printed circuit substrate; and a shim interposed between the plurality of light-emitting diodes and the printed circuit substrate, wherein the shim is configured to raise the height of the plurality of light-emitting diodes relative to the printed circuit substrate.

14. The backlight assembly defined in claim 13 wherein each light-emitting diode in the plurality of light-emitting diodes comprises at least one power supply terminal, wherein the printed circuit substrate comprises at least one solder pad, and wherein the at least one power supply terminal is electrically coupled to the at least one solder pad.

15. The backlight assembly defined in claim 14 wherein the shim comprises a plurality of openings and wherein at least one opening in the plurality of openings aligns with the at least one power supply terminal and the at least one solder pad.

16. The backlight assembly defined in claim 15 further comprising solder in the at least one opening, wherein the solder forms an electrical connection between the at least one power supply terminal and the at least one solder pad.

17. The backlight assembly defined in claim 13 further comprising a reflector configured to reflect the light into the light guide plate, wherein the reflector has a portion adhered to the printed circuit substrate.

18. The backlight assembly defined in claim 13 wherein a portion of the light guide plate is attached to the printed circuit substrate using adhesive.

\* \* \* \* \*